(12) United States Patent
Ohbayashi et al.

(10) Patent No.: US 8,543,257 B2
(45) Date of Patent: Sep. 24, 2013

(54) VEHICLE REMOTE OPERATION SYSTEM AND ON-BOARD DEVICE

(75) Inventors: Motonari Ohbayashi, Susono (JP); Ayako Nishimura, Gotemba (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 13/578,508

(22) PCT Filed: Feb. 16, 2010

(86) PCT No.: PCT/JP2010/052270
§ 371 (c)(1),
(2), (4) Date: Aug. 10, 2012

(87) PCT Pub. No.: WO2011/101951
PCT Pub. Date: Aug. 25, 2011

(65) Prior Publication Data
US 2012/0316704 A1    Dec. 13, 2012

(51) Int. Cl.
*G05D 1/00* (2006.01)
(52) U.S. Cl.
USPC ............................................................ 701/2
(58) Field of Classification Search
USPC ............................................................ 701/2
See application file for complete search history.

(56) References Cited

U.S. PATENT DOCUMENTS

| 2004/0145448 A1* | 7/2004 | Tanaka et al. ............... 340/5.72 |
| 2009/0265048 A1* | 10/2009 | Ono et al. ......................... 701/2 |
| 2012/0078443 A1* | 3/2012 | Matsubara ........................ 701/2 |

FOREIGN PATENT DOCUMENTS

| JP | 05073134 A | 3/1993 |
| JP | 9-136660 A | 5/1997 |
| JP | 2002168018 A | 6/2002 |
| JP | 2006-306233 A | 11/2006 |
| JP | 2008015839 A | 1/2008 |
| JP | 2008033438 A | 2/2008 |

\* cited by examiner

*Primary Examiner* — Mary Cheung
*Assistant Examiner* — Anne Mazzara
(74) *Attorney, Agent, or Firm* — Gifford, Krass, Sprinkle, Anderson & Citkowski, P.C.

(57) ABSTRACT

In a vehicle remote operation system that remotely operates a vehicle V using a portable terminal 200, during the remote operation of the vehicle V by the portable terminal 200, when the cab of the vehicle V is not locked, a main control unit 112 of an on-board device 100 does not permit movement of the vehicle V. Therefore, the vehicle V can be remotely operated only when the cab of the vehicle is locked. As a result, it is possible to prevent a malicious person from getting in the vehicle V during the remote operation. In addition, even when a well-meaning person who gets in the cab unexpectedly unlocks and opens the door, the vehicle is stopped. Therefore, it is possible to ensure safety.

18 Claims, 5 Drawing Sheets

VEHICLE REMOTE OPERATION SYSTEM AND ON-BOARD DEVICE

TECHNICAL FIELD

The present invention relates to a vehicle remote operation system and an on-board device and more particularly, to a vehicle remote operation system for remotely operating a vehicle using a communication terminal and an on-board device.

BACKGROUND ART

A technique has been proposed which remotely operates the vehicle using a communication terminal. For example, Patent Literature 1 discloses a vehicle remote operation system which is used in a situation in which a parking place is narrow, it is difficult to open the door of the parked vehicle wide, and it is difficult for a person to get in the vehicle.

In the vehicle remote operation system disclosed in Patent Literature 1 which remotely operates the vehicle to move using the portable terminal, the authentication required for the user during a first remote vehicle moving operation of moving a remote operation target vehicle from a parked state in which the vehicle is stopped in a predetermined parking place to a retrieved state in which the vehicle is stopped outside the predetermined parking space is stricter than the authentication required for the user during a second remote vehicle moving operation of moving the remote operation target vehicle from the retrieved state to the parked state. The degree of strictness of authentication is changed by changing the number of authentication types. Alternatively, the degree of strictness of authentication is changed by determining whether to perform one or both of vehicle-side authentication and terminal-side authentication.

CITATION LIST

Patent Literature

[Patent Literature 1] Japanese Unexamined Patent Application Publication No. 2008-33438

SUMMARY OF INVENTION

Technical Problem

However, in the technique which remotely operates the vehicle using the communication terminal, when the vehicle is parked by the remote operation, the speed of the moving vehicle is relatively low and the acceleration thereof is also low. Therefore, when the vehicle is parked by the remote operation, a malicious person is likely to get in the vehicle to steal the vehicle.

The invention has been made in view of the above-mentioned problems and an object of the invention is to provide a vehicle remote operation system and an on-board device capable of preventing a vehicle theft during a remote operation.

Solution to Problem

According to an aspect of the invention, there is provided a vehicle remote operation system that remotely operates a vehicle using a communication terminal. The vehicle remote operation system includes a movement prohibition unit that prohibits movement of the vehicle when a cab of the vehicle is not locked during the remote operation of the vehicle by the communication terminal.

According to this structure, in the vehicle remote operation system that remotely operates the vehicle using the communication terminal, the movement prohibition unit prohibits movement of the vehicle when a cab of the vehicle is not locked during the remote operation of the vehicle by the communication terminal. Therefore, the vehicle can be remotely operated only when the cab of the vehicle is locked. As a result, it is possible to prevent a malicious person from getting in the vehicle during the remote operation.

In this case, the vehicle remote operation system may further include a vehicle in-cab operation prohibition unit that prohibits operations in a cab when the communication terminal remotely operates the vehicle.

According to this structure, the vehicle in-cab operation prohibition unit prohibits operations in a cab when the communication terminal remotely operates the vehicle. Therefore, it is possible to prevent vehicle theft even when a malicious person forcibly unlocks the locked cab of the vehicle, gets in the vehicle, locks the cab of the vehicle again, and performs, for example, an operation of depressing the accelerator pedal during the remote operation.

In this case, when the communication terminal remotely operates the vehicle to park, the vehicle in-cab operation prohibition unit may permit only an operation of parking the vehicle among the operations in the cab of the vehicle.

According to this structure, when the communication terminal remotely operates the vehicle to park, the vehicle in-cab operation prohibition unit permits only the operation of parking the vehicle among the operations in the cab of the vehicle. Therefore, it is possible to prevent vehicle theft and only the parking operation can be performed in the cab. As a result, convenience is improved.

In this case, the vehicle in-cab operation prohibition unit may permit only an operation of parking the vehicle using a dedicated key for starting an engine of the vehicle when the communication terminal remotely operates the vehicle to park.

According to this structure, the vehicle in-cab operation prohibition unit permits only the operation of parking the vehicle using the dedicated key for starting the engine of the vehicle when the communication terminal remotely operates the vehicle to park. Therefore, even when a malicious person forcibly unlocks the locked cab, gets in the vehicle, and locks the cab again during the remote operation, a key generally used to start the engine of the vehicle is prevented from being kept in the cab. As a result, convenience is improved.

During the remote operation of the vehicle by the communication terminal, the movement prohibition unit may prohibit movement of the vehicle even though the cab of the vehicle is locked again after the locked cab of the vehicle is unlocked.

According to this structure, during the remote operation of the vehicle by the communication terminal, the movement prohibition unit prohibits movement of the vehicle even though the cab of the vehicle is locked again after the locked cab of the vehicle is unlocked. Therefore, it is possible to prevent vehicle theft even when a malicious person forcibly unlocks the cab, gets in the vehicle, locks the cab again, and performs operations in the cab, for example, an operation of depressing the accelerator pedal during the remote operation.

In this case, during the remote operation of the vehicle by the communication terminal, when the locked cab of the vehicle is unlocked and movement of the vehicle is prohibited, the movement prohibition unit may permit movement of the vehicle again in response to a command from the communication terminal.

According to this structure, during the remote operation of the vehicle by the communication terminal, when the locked cab of the vehicle is unlocked and movement of the vehicle is prohibited, the movement prohibition unit permits movement of the vehicle again in response to the command from the communication terminal. Therefore, convenience is improved when, for example, the owner of the vehicle who operates the communication terminal wants to unlock the cab of the vehicle for a predetermined purpose.

In this case, during the remote operation of the vehicle by the communication terminal, when the locked cab of the vehicle is unlocked, movement of the vehicle is not permitted, and movement of the vehicle is permitted again in response to the command from the communication terminal, the movement prohibition unit may permit only movement to park the vehicle among movements of the vehicle.

According to this structure, during the remote operation of the vehicle by the communication terminal, when the locked cab of the vehicle is unlocked, movement of the vehicle is prohibited, and movement of the vehicle is permitted again in response to the command from the communication terminal, the movement prohibition unit permits only movement to park the vehicle among movements of the vehicle. Therefore, convenience is improved when, for example, the owner of the vehicle who operates the communication terminal wants to unlock the cab of the vehicle for a predetermined purpose and it is possible to reduce the possibility of vehicle theft.

The vehicle remote operation system according to the above-mentioned aspect may include a temporary stop unit that can temporarily stop movement the vehicle in response to a command from the communication terminal when the communication terminal remotely operates the vehicle to move according to a predetermined plan.

According to this structure, the temporary stop unit can temporarily stop movement of the vehicle in response to the command from the communication terminal when the communication terminal remotely operates the vehicle to move according to the predetermined plan. Therefore, for example, even during movement of the vehicle according to the plan set for parking, convenience is improved when the owner of the vehicle who operates the communication terminal wants to temporarily stop the vehicle for a predetermined purpose.

In this case, during the remote operation of the communication terminal moving the vehicle according to the predetermined plan, when movement of the vehicle is temporarily stopped in response to the command from the communication terminal, the temporary stop unit may resume movement of the vehicle according to the plan in response to a command to cancel the temporary stopping of the vehicle from the communication terminal.

According to this structure, during the remote operation of the communication terminal moving the vehicle according to the predetermined plan, when movement the vehicle is temporarily stopped in response to the command from the communication terminal, the temporary stop unit resumes movement of the vehicle according to the plan in response to the command to cancel the temporary stopping of the vehicle from the communication terminal. Therefore, it is not necessary to reset the plan to move the vehicle and convenience is further improved.

According to another aspect of the invention, there is provided an on-board device that is provided in a vehicle in a vehicle remote operation system which remotely operates the vehicle using a communication terminal. The on-board device includes a movement prohibition unit that prohibits movement of the vehicle when the cab of the vehicle is not locked during the remote operation of the vehicle by the communication terminal.

In this case, the on-board device according to the above-mentioned aspect may further include a vehicle in-cab operation prohibition unit that prohibits operations in a cab when the communication terminal remotely operates the vehicle.

In this case, when the communication terminal remotely operates the vehicle to park, the vehicle in-cab operation prohibition unit may permit only an operation of parking the vehicle among the operations in the cab of the vehicle.

In this case, the vehicle in-cab operation prohibition unit may permit only an operation of parking the vehicle using a dedicated key for starting the engine of the vehicle when the communication terminal remotely operates the vehicle to park.

During the remote operation of the vehicle by the communication terminal, the movement prohibition unit may prohibit movement of the vehicle even though the cab of the vehicle is locked again after the locked cab of the vehicle is unlocked.

In this case, during the remote operation of the vehicle by the communication terminal, when the locked cab of the vehicle is unlocked and movement of the vehicle is prohibited, the movement prohibition unit may permit movement of the vehicle again in response to a command from the communication terminal.

In this case, during the remote operation of the vehicle by the communication terminal, when the locked cab of the vehicle is unlocked, movement of the vehicle is prohibited, and movement of the vehicle is permitted again in response to the command from the communication terminal, the movement prohibition unit may permit only movement to park the vehicle among movements of the vehicle.

The on-board device according to the above-mentioned aspect may further include a temporary stop unit that can temporarily stop movement of the vehicle in response to a command from the communication terminal when the communication terminal remotely operates the vehicle to move according to a predetermined plan.

In this case, during the remote operation of the communication terminal moving the vehicle according to the predetermined plan, when movement the vehicle is temporarily stopped in response to the command from the communication terminal, the temporary stop unit may resume movement of the vehicle according to the plan in response to a command to cancel the temporary stopping of the vehicle from the communication terminal.

Advantageous Effects of Invention

According to the vehicle remote operation system and the on-board device of the invention, it is possible to prevent a malicious person from getting in the vehicle during a remote operation.

DESCRIPTION OF EMBODIMENTS

Figure 1:
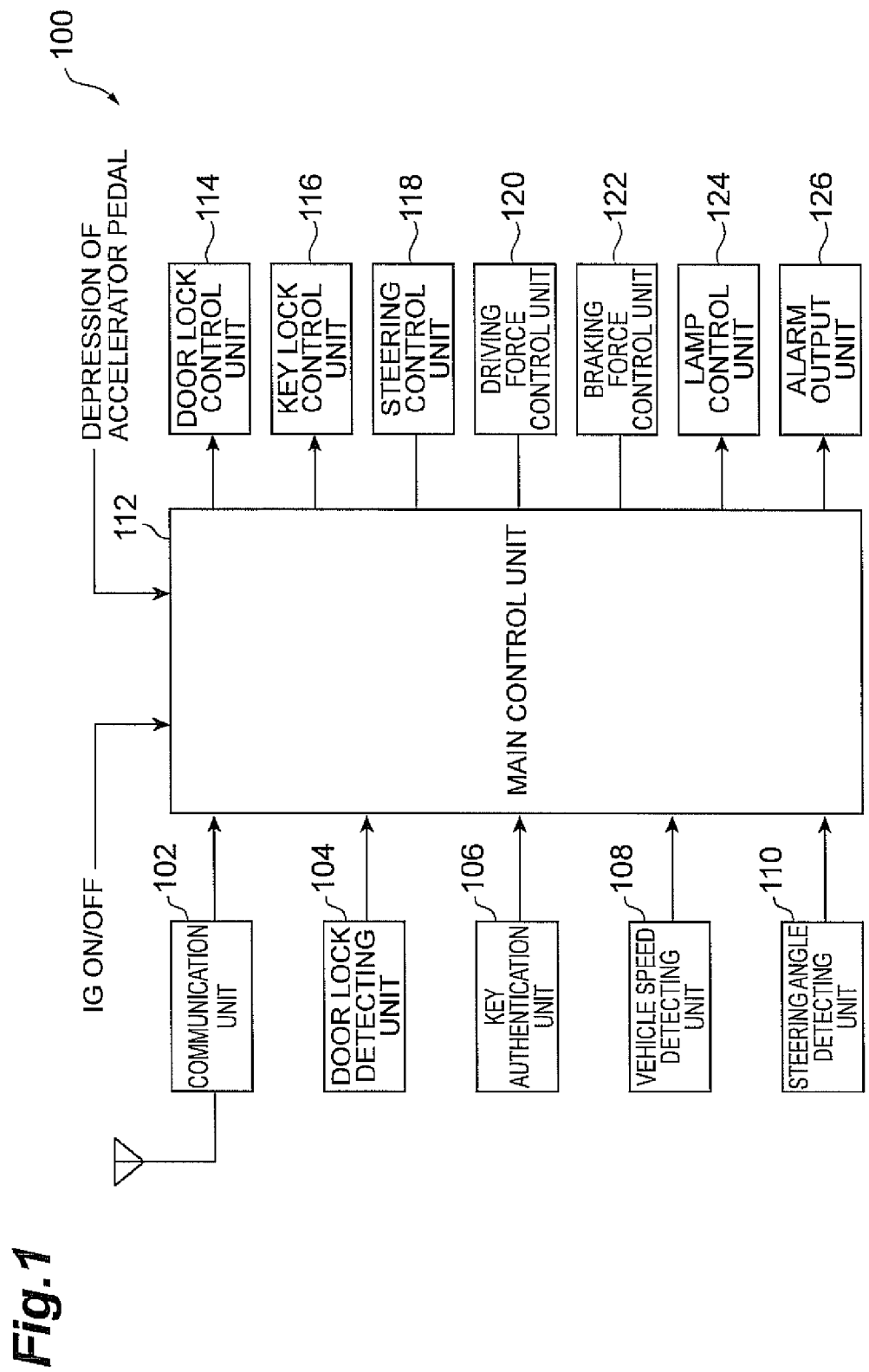
FIG. 1 is a block diagram illustrating the structure of an on-board device in a vehicle remote operation system according to an embodiment.

Hereinafter, an exemplary embodiment of the invention will be described with reference to the accompanying drawings. A vehicle remote operation system and an on-board device according to this embodiment are for allowing, for example, the driver who gets out of the vehicle to remotely operate the vehicle to park in a parking place using a portable terminal in a situation in which the parking place is narrow, it is difficult to open the door of the parked vehicle wide, and it is difficult for the driver to get in and out of the vehicle. As shown in FIG. 1, in the remote operation system according to this embodiment, an on-board device 100 which is provided in the vehicle includes a communication unit 102, a door lock detecting unit 104, a key authentication unit 106, a vehicle speed detecting unit 108, a steering angle detecting unit 110, a main control unit 112, a door lock control unit 114, a key lock control unit 116, a steering control unit 118, a driving force control unit 120, a braking force control unit 122, a lamp control unit 124, and an alarm output unit 126.

The communication unit 102 is for transmitting and receiving radio signals to and from the portable terminal. The door lock detecting unit 104 is for detecting whether the door of the cab is locked. The key authentication unit 106 is for authenticating whether a key for starting the engine of the vehicle and a parking key (card) are of the true owner of the vehicle. The vehicle speed detecting unit 108 is for detecting the speed of the vehicle from the rotation speed of the wheel. The steering angle detecting unit 110 is for detecting the steering angle of the vehicle.

The main control unit 112 is for controlling the overall operation of each component of the on-board device 100. Specifically, the main control unit 112 is an ECU (Electronic Control Unit). Information about the on or off state of the ignition switch or information about the amount of depression of the accelerator pedal is input to the main control unit 112. The main control unit 112 is remotely operated to park and retrieve the vehicle according to a predetermined parking program or a predetermined retrieving program in response to a communication signal from the portable terminal.

The door lock control unit 114 is for locking and unlocking the door of the cab in response to a command signal from the main control unit 112. The key lock control unit 116 is for fixing and unfixing the steering wheel or the transmission of the vehicle in response to a command signal from the main control unit 112.

The steering control unit 118 is for performing steering independently from a steering operation input to the steering wheel in response to a command signal from the main control unit 112, thereby changing the traveling direction of the vehicle. The driving force control unit 120 opens and closes a throttle valve independently from an acceleration operation input to the accelerator pedal in response to a command signal from the main control unit 112, thereby changing the driving force of the vehicle. The braking force control unit 122 controls brake oil pressure independently from a braking operation input to a brake pedal in response to a command signal from the main control unit 112, thereby changing the braking force of the vehicle.

The lamp control unit 124 is for controlling the turning on or off of lamps provided in the vehicle, such as a headlights, hazard light, brake lights, and direction indicators. The alarm output unit 126 is for outputting an alarm to the user who remotely operates the vehicle outside the vehicle using, for example, a lamp, such as the hazard lights, a buzzer, or a speaker provided in the vehicle.

Figure 2:
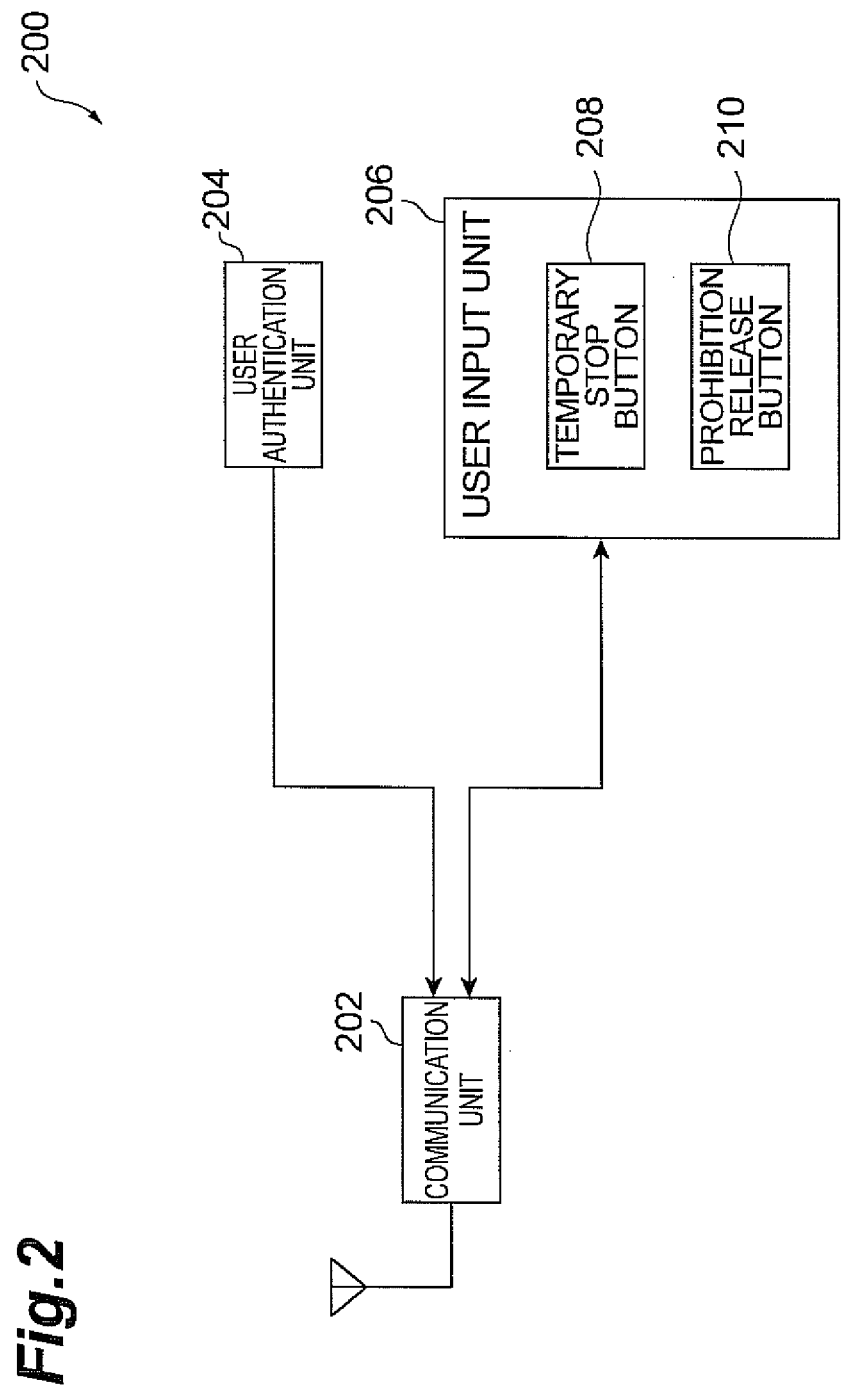
FIG. 2 is a block diagram illustrating the structure of a portable terminal in the vehicle remote operation system according to the embodiment.

As shown in FIG. 2, a portable terminal 200 which is used by the user to remotely operate the vehicle outside the vehicle includes a communication unit 202, a user authentication unit 204, and a user input unit 206.

The communication unit 202 is for transmitting and receiving radio signals to and from the on-board device 100. The user authentication unit 204 is for authenticating the user who operates the portable terminal 200. In this case, the authentication may be performed by a predetermined authentication number, a cipher, a password, a card, a key, and biometric data, such as fingerprints and the iris.

The user input unit 206 is used by the user who remotely operates the vehicle to input operational information. The user input unit 206 includes operation keys and buttons (not shown) for allowing the on-board device 100 to execute the parking program or the retrieving program, a temporary stop button 208, and a prohibition release button 210. The temporary stop button 208 is for temporarily stopping movement of the vehicle and resuming movement of the vehicle to park when the portable terminal 200 remotely moves the vehicle to part according to the parking program. In this case, a restart button for resuming movement of the vehicle to park may be provided separately. The prohibition release button 210 is for releasing the prohibition of movement of the vehicle when movement of the vehicle is prohibited.

Figure 3:
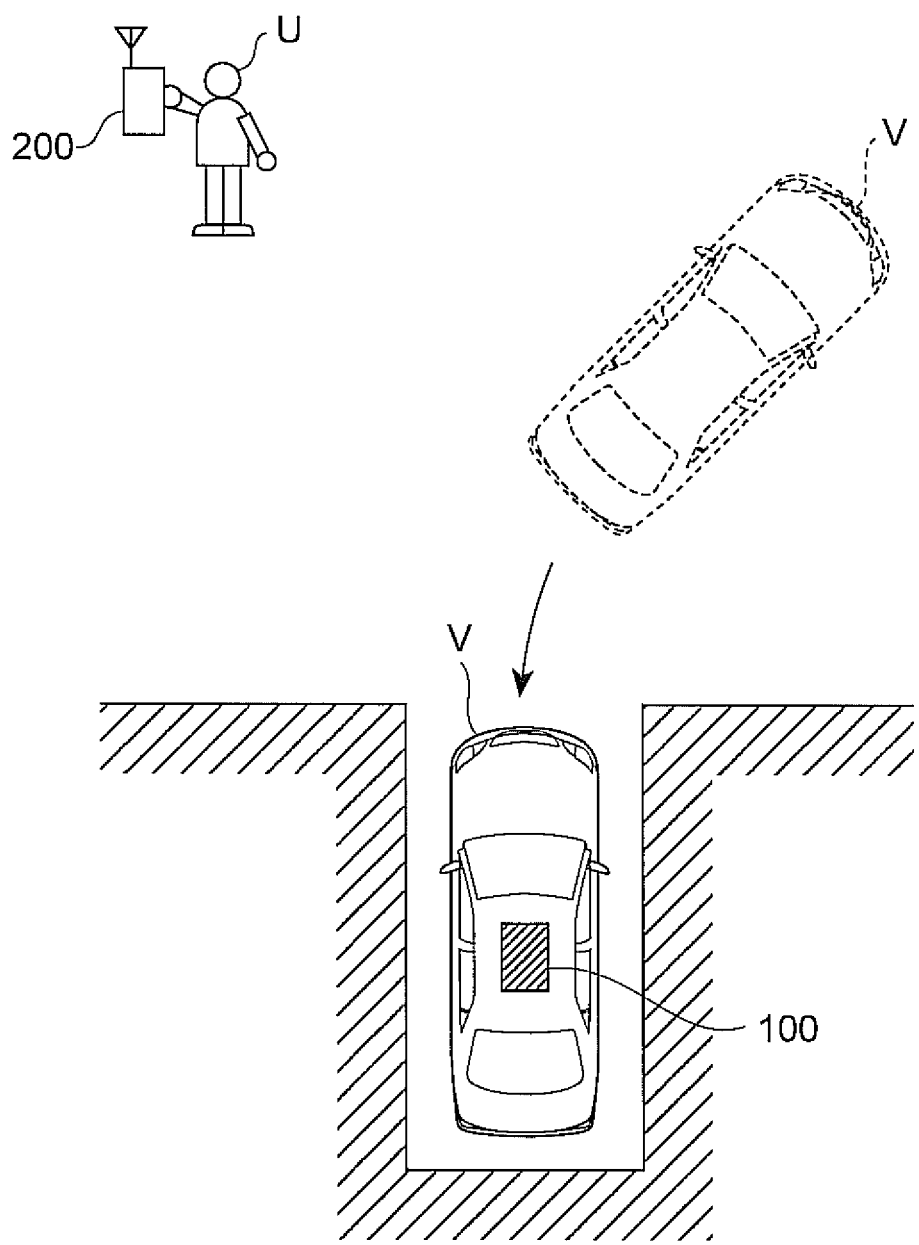
FIG. 3 is a plan view illustrating an aspect in which the vehicle is parked by the vehicle remote operation system according to the embodiment.

Next, the operation of the vehicle remote operation system and the on-board device will be described. As shown in FIG. 3, the vehicle remote operation system according to this embodiment is used in a situation in which the user U who gets out of the vehicle outside the parking place uses the portable terminal 200 to remotely operate the vehicle V provided with the on-board device 100 according to a predetermined parking program such that the vehicle is parked in the parking place in a situation in which the parking place is narrow, it is difficult to open the door of the parked vehicle V wide, and it is difficult for the user U to get out of the vehicle V.

Figure 4:
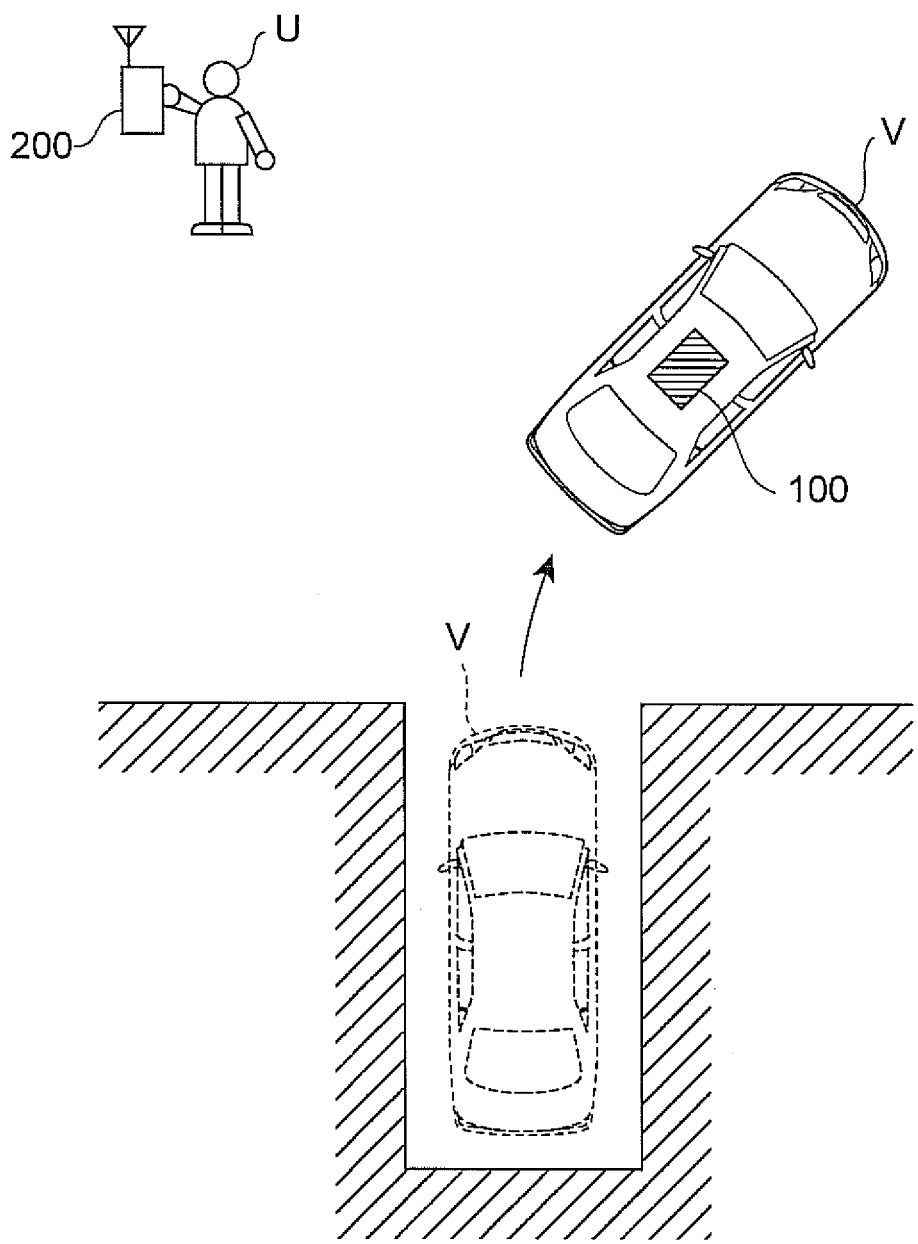
FIG. 4 is a plan view illustrating an aspect in which the vehicle is retrieved by the vehicle remote operation system according to the embodiment.

Alternatively, as shown in FIG. 4, the vehicle remote operation system according to this embodiment is used in a situation in which the user U who is disposed outside the parking place uses the portable terminal 200 to remotely operate the vehicle V provided with the on-board device 100 according to a predetermined retrieving program such that the vehicle is moved to the outside of the parking place in a situation in which the parking place is narrow, it is difficult to open the door of the parked vehicle V wide, and it is difficult for the user U to get in the vehicle V. Next, the remote operation during parking shown in FIG. 3 will be described.

Figure 5:
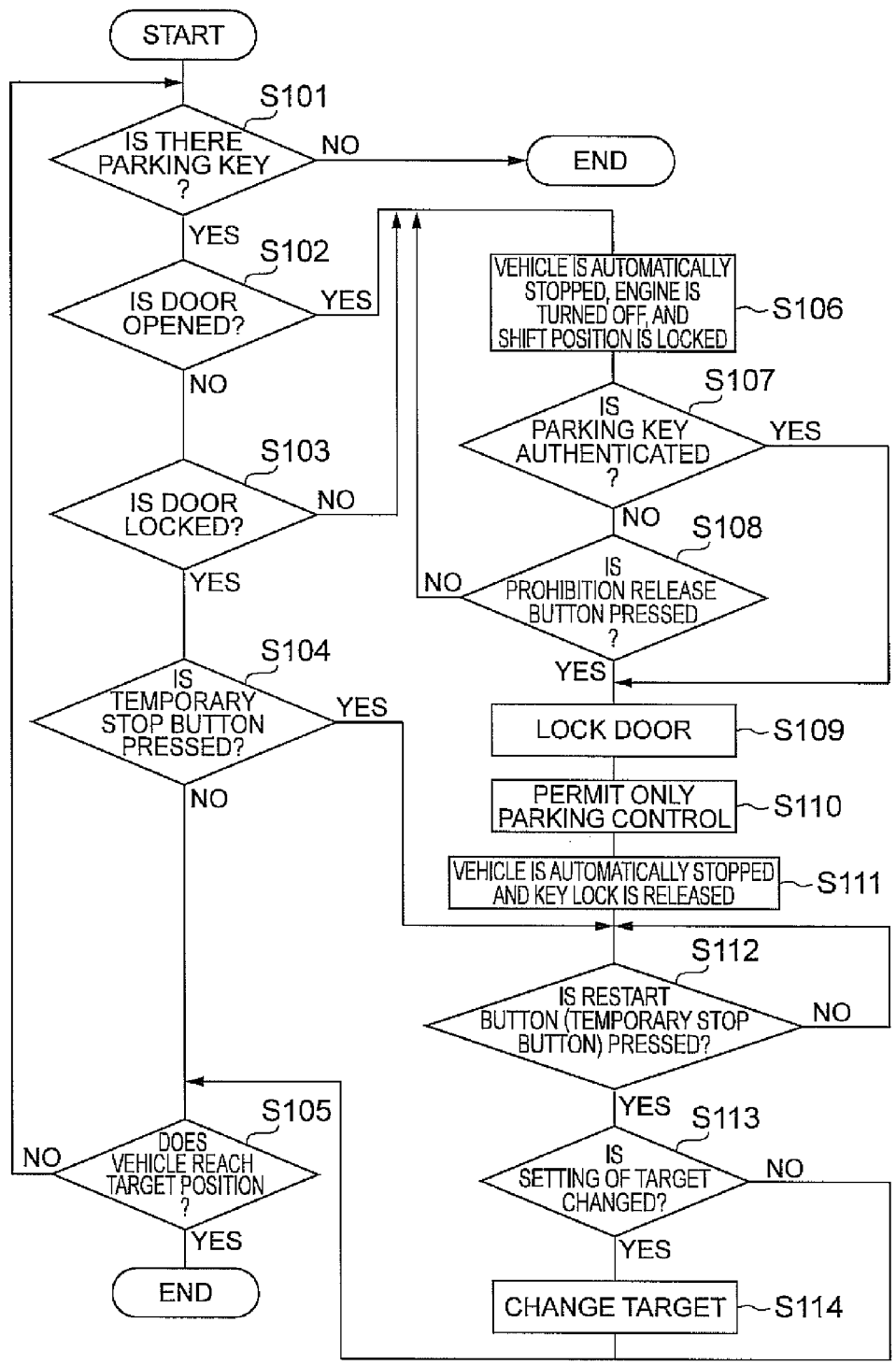
FIG. 5 is a flowchart illustrating the operation of the vehicle remote operation system according to the embodiment.

It is assumed that the main control unit 112 of the on-board device 100 executes a predetermined parking program in response to a communication signal from the portable terminal 200. As shown in FIG. 5, when the key authentication unit 106 of the on-board device 100 authenticates a parking key (card), which is a dedicated engine key, during parking, the main control unit 112 performs the subsequent step (S101). When the parking key is not authenticated, the main control unit 112 does not move the vehicle using a remote operation.

The door lock detecting unit 104 checks whether the door of the cab is opened (S102). When it is checked that the door of the cab is locked (S103) and the user U does not press the temporary stop button 208 of the portable terminal 200 (S104), the main control unit 112 moves the vehicle V according to a predetermined parking program until the vehicle V reaches a target position, such as a parking position (S105).

White the vehicle V is being moved by the remote operation according to the parking program, the main control unit 112 prohibits the operations of the vehicle V other than the parking operation inside the vehicle. Therefore, even when the person in the driver's seat of the vehicle V performs a driving operation, the main control unit 112 does not receive operations other than the parking operation.

When the door lock detecting unit 104 detects that the door of the cab is opened (S102) or when the door lock detecting unit 104 detects that the door of the cab is not locked (S103), the main control unit 112 directs the driving force control unit 120 and the braking force control unit 122 to automatically stop the vehicle V and turns off the engine (S106). In addition, when the door lock detecting unit 104 detects that the door of the cab is opened (S102), the main control unit 112 directs the key lock control unit 116 to fix the shift position of the transmission or the steering wheel (S106). Then, movement of the vehicle V is prohibited.

When the parking key is not authenticated by the key authentication unit 106 (S107) and the user U does not press the prohibition release button 210 of the portable terminal 200 (S108), the prohibition of movement of the vehicle V is maintained.

When the parking key is not authenticated by the key authentication unit 106 (S107), but the user U presses the prohibition release button 210 of the portable terminal 200 (S108), the door of the cab is locked (S109) and the main control unit 112 performs only parking control for moving the vehicle to park (S110). Then, the main control unit 112 directs the driving force control unit 120 and the braking force control unit 122 to move the vehicle V again and directs the key lock control unit 116 to unfix the shift position of the transmission or the steering wheel (S111).

When the parking key is authenticated by the key authentication unit 106 (S107), the door of the cab is locked (S109) and the main control unit 112 performs only parking control for moving the vehicle to park (S110). Then, the main control unit 112 directs the driving force control unit 120 and the braking force control unit 122 to move the vehicle V again and directs the key lock control unit 116 to unfix the shift position of the transmission or the steering wheel (S111).

In the case in which the user U presses the temporary stop button 208 of the portable terminal 200 (S104), when the user U presses the temporary stop button 208 of the portable terminal 200 again (S112), the main control unit 112 resumes the execution of the parking program and moves the vehicle V according to the parking program until the vehicle reaches the target position (S105). When the user U uses the portable terminal 200 to change the setting of a target, such as a target position or a target speed (S113), the main control unit 112 changes the target (S114). Then, the main control unit 112 performs the subsequent process (S105).

In this embodiment, in the vehicle remote operation system in which the portable terminal 200 remotely operates the vehicle V, during the remote operation of the vehicle V by the portable terminal 200, when the cab of the vehicle V is not locked, the main control unit 112 of the on-board device 100 does not permit movement of the vehicle V. Therefore, the vehicle V can be remotely operated only when the cab of the vehicle V is locked. As a result, it is possible to prevent a malicious person from getting in the vehicle V during the remote operation. In addition, when a well-meaning person who gets in the cab unexpectedly unlocks and opens the door, the vehicle is stopped. As a result, it is possible to ensure safety.

In this embodiment, when the portable terminal 200 remotely operates the vehicle V, the main control unit 112 of the on-board device 100 does not permit the operation of the vehicle V in the vehicle. Therefore, it is possible to prevent vehicle theft even when a malicious person forcibly unlocks the locked cab, gets in the vehicle, locks the door again, and performs operations in the cab, for example, an operation of depressing the accelerator pedal during the remote operation.

In this embodiment, when the portable terminal 200 remotely operates the vehicle V to park, the main control unit 112 of the on-board device 100 permits only an operation of parking the vehicle V among the operations performed inside the vehicle V. Therefore, it is possible to perform only the parking operation in the vehicle, in addition to preventing the theft of the vehicle V. As a result, convenience is improved.

In this embodiment, when the portable terminal 200 remotely operates the vehicle V to park, the main control unit 112 of the on-board device 100 permits only an operation of parking the vehicle V using a dedicated key for starting the engine of the vehicle V. Therefore, even when a malicious person forcibly unlocks the locked cab, gets in the vehicle, and locks the cab again during the remote operation, a key generally used to start the engine of the vehicle V is prevented from being kept in the cab. As a result, convenience is improved.

In this embodiment, during the remote operation of the vehicle V by the portable terminal 200, even when the locked cab of the vehicle V is unlocked and the cab of the vehicle is locked again, the main control unit 112 of the on-board device 100 does not permit movement of the vehicle V. Therefore, it is possible to prevent theft of the vehicle V even when a malicious person forcibly unlocks the locked cab, gets in the vehicle, locks the cab again, and performs operations in the cab, for example, an operation of depressing the accelerator pedal during the remote operation.

In this embodiment, during the remote operation of the vehicle V by the portable terminal 200, when the locked cab of the vehicle V is unlocked and movement of the vehicle V is not permitted, the main control unit 112 of the on-board device 100 permits movement of the vehicle V again in response to a command from the portable terminal 200. Therefore, for example, convenience is improved when the owner of the vehicle V who operates the portable terminal 200 wants to unlock the cab of the vehicle for a predetermined purpose.

In this embodiment, during the remote operation of the vehicle V by the portable terminal 200, when the locked cab of the vehicle V is unlocked, movement of the vehicle V is not performed, and movement of the vehicle V is permitted again in response to a command from the portable terminal 200r, the main control unit 112 of the on-board device 100 permits only an operation of parking the vehicle V among the operations of moving the vehicle V. Therefore, for example, convenience is improved when the owner of the vehicle V who operates the portable terminal 200 wants to unlock the cab of the vehicle for a predetermined purpose, and it is possible to reduce the possibility of vehicle theft.

According to this embodiment, when the portable terminal 200 remotely operates the vehicle V to move according to a plan, such as a predetermined parking program, the main control unit 112 of the on-board device 100 can temporarily stop movement of the vehicle V in response to a command from the portable terminal 200. Therefore, for example, even during movement of the vehicle V according to the parking program set for parking, convenience is improved when the owner of the vehicle V who operates the portable terminal 200 wants to temporarily stop the vehicle V for a predetermined purpose.

According to this embodiment, during the remote operation of the portable terminal 200 moving the vehicle V according to a plan, such as a predetermined parking program, when movement of the vehicle V is temporarily stopped in response to a command from the portable terminal 200, the main control unit resumes movement of the vehicle V according to the parking program in response to a command to cancel the temporary stopping of the vehicle V from the portable terminal 200. Therefore, it is not necessary to reset the plan to move the vehicle V, such as the parking program, and convenience is further improved.

The embodiment of the invention has been described above, but the invention is not limited thereto. Various modifications and changes can be made without departing from the scope and spirit of the invention. For example, in the above-described embodiment, the vehicle is remotely operated when it gets in and out of the parking place. However, the invention can be applied to a case in which the vehicle travels generally.

INDUSTRIAL APPLICABILITY

According to the vehicle remote operation system and the on-board device of the invention, it is possible to prevent a malicious person from getting in the vehicle during a remote operation.

REFERENCE SIGNS LIST

100: On-Board Device
102: Communication Unit
104: Door Lock Detecting Unit
106: Key Authentication Unit
108: Vehicle Speed Detecting Unit
110: Steering Angle Detecting Unit
112: Main Control Unit
114: Door Lock Control Unit
116: Key Lock Control Unit
118: Steering Control Unit
120: Driving Force Control Unit
122: Braking Force Control Unit
124: Lamp Control Unit
126: Alarm Output Unit
200: Portable Terminal
202: Communication Unit
204: User Authentication Unit
206: User Input Unit
208: Temporary Stop Button
210: Prohibition Release Button

The invention claimed is:

1. A vehicle remote operation system that remotely operates a vehicle using a communication terminal, comprising:
a movement prohibition unit that prohibits movement of the vehicle when the communication terminal remotely operates the vehicle to move and a cab of the vehicle is not locked.

2. The vehicle remote operation system according to claim 1, further comprising:
a vehicle in-cab operation prohibition unit that prohibits operations in a cab when the communication terminal remotely operates the vehicle to move.

3. The vehicle remote operation system according to claim 2,
wherein, when the communication terminal remotely operates the vehicle to park, the vehicle in-cab operation prohibition unit permits only an operation of parking the vehicle among the operations in the cab of the vehicle.

4. The vehicle remote operation system according to claim 3,
wherein the vehicle in-cab operation prohibition unit permits only an operation of parking the vehicle using a dedicated key for starting an engine of the vehicle when the communication terminal remotely operates the vehicle to park.

5. The vehicle remote operation system according to claim 1,
wherein, during the remote operation of the vehicle by the communication terminal, the movement prohibition unit prohibits movement of the vehicle even though the cab of the vehicle is locked again after the locked cab of the vehicle is unlocked.

6. The vehicle remote operation system according to claim 5,
wherein, during the remote operation of the vehicle by the communication terminal, when the locked cab of the vehicle is unlocked and movement of the vehicle is prohibited, the movement prohibition unit permits movement of the vehicle again in response to a command from the communication terminal.

7. The vehicle remote operation system according to claim 6,
wherein, during the remote operation of the vehicle by the communication terminal, when the locked cab of the vehicle is unlocked, movement of the vehicle is prohibited, and movement of the vehicle is permitted again in response to the command from the communication terminal, the movement prohibition unit permits only movement to park the vehicle among movements of the vehicle.

8. The vehicle remote operation system according to claim 1, further comprising:
a temporary stop unit that can temporarily stop movement of the vehicle in response to a command from the communication terminal when the communication terminal remotely operates the vehicle to move according to a predetermined plan.

9. The vehicle remote operation system according to claim 8,
wherein, during the remote operation of the communication terminal moving the vehicle according to the predetermined plan, when movement of the vehicle is temporarily stopped in response to the command from the communication terminal, the temporary stop unit resumes movement of the vehicle according to the plan in response to a command to cancel the temporary stopping of the vehicle from the communication terminal.

10. An on-board device that is provided in a vehicle remote operation system which remotely operates the vehicle using a communication terminal, comprising:
a movement prohibition unit that prohibits movement of the vehicle when the communication terminal remotely operates the vehicle to move and a cab of the vehicle is not locked.

11. The on-board device according to claim 10, further comprising:
a vehicle in-cab operation prohibition unit that prohibits operations in a cab when the communication terminal remotely operates the vehicle to move.

12. The on-board device according to claim 11, wherein, when the communication terminal remotely operates the vehicle to park, the vehicle in-cab operation prohibition unit permits only an operation of parking the vehicle among the operations in the cab of the vehicle.

13. The on-board device according to claim 12, wherein the vehicle in-cab operation prohibition unit permits only an operation of parking the vehicle using a dedicated key for starting an engine of the vehicle when the communication terminal remotely operates the vehicle to park.

14. The on-board device according to claim 10, wherein, during the remote operation of the vehicle by the communication terminal, the movement prohibition unit prohibits movement of the vehicle even though the cab of the vehicle is locked again after the locked cab of the vehicle is unlocked.

15. The on-board device according to claim 14, wherein, during the remote operation of the vehicle by the communication terminal, when the locked cab of the vehicle is unlocked and movement of the vehicle is prohibited, the movement prohibition unit permits movement of the vehicle again in response to a command from the communication terminal.

16. The on-board device according to claim 15, wherein, during the remote operation of the vehicle by the communication terminal, when the locked cab of the vehicle is unlocked, movement of the vehicle is prohibited, and movement of the vehicle is permitted again in response to the command from the communication terminal, the movement prohibition unit permits only movement to park the vehicle among movements of the vehicle.

17. The on-board device according to claim 10, further comprising:

a temporary stop unit that can temporarily stop movement of the vehicle in response to a command from the communication terminal when the communication terminal remotely operates the vehicle to move according to a predetermined plan.

18. The on-board device according to claim 17, wherein, during the remote operation of the communication terminal moving the vehicle according to the predetermined plan, when movement of the vehicle is temporarily stopped in response to the command from the communication terminal, the temporary stop unit resumes movement of the vehicle according to the plan in response to a command to cancel the temporary stopping of the vehicle from the communication terminal.

* * * * *